United States Patent [19]

Tweed

[11] 4,282,829
[45] Aug. 11, 1981

[54] ANIMAL OBSERVATORY AND TOY APPARATUS

[76] Inventor: Dennis O. Tweed, 420-21st Ave. SW., Rochester, Mich. 55901

[21] Appl. No.: 104,954

[22] Filed: Dec. 18, 1979

[51] Int. Cl.³ .............................................. A01K 1/02
[52] U.S. Cl. ..................................................... 119/19
[58] Field of Search ...................... 119/19, 17, 15, 49, 119/1

[56] References Cited

U.S. PATENT DOCUMENTS

| | | | |
|---|---|---|---|
| 2,696,349 | 12/1954 | Baumstark | 119/45 R |
| 3,234,908 | 2/1966 | Doskocil | 119/19 |
| 3,580,219 | 5/1971 | Stebbins | 119/1 |
| 3,611,994 | 10/1971 | Bailey | 119/17 |
| 3,626,902 | 12/1971 | Orfei | 119/15 |
| 3,687,110 | 8/1972 | Braunhut | 119/1 |
| 3,791,347 | 2/1974 | Lovell | 119/19 |
| 3,834,352 | 9/1974 | Gervis | 119/17 |
| 3,874,335 | 4/1975 | Galasso | 119/1 |
| 4,130,088 | 12/1978 | Salvia | 119/19 |

Primary Examiner—Hugh R. Chamblee
Attorney, Agent, or Firm—Merchant, Gould, Smith, Edell, Welter & Schmidt

[57] ABSTRACT

An observatory cage (10) for small animals, sized for ease of handling and use by children and having utility features that also function as child amusement devices, is disclosed. The observatory cage has a floor (11) and a plurality of non-transparent walls (12-16) cooperatively defining an internal cavity (20) for housing small animals for observation. The cavity is provided with access means (12, 22) for loading and unloading, and with ventilation means (24). A plug member (26) normally forming a portion of one of the walls of the observatory is removable to expose an observation port (28) into the cavity. Obstruction means (30) close egress through the observation port when the plug is removed. Means (32, 34) are provided for securing the plug member to the cage when removed from the observation port. Additional features include a reservoir (40), a counter (46), a foliage hanger (40) and a carrying handle (50).

27 Claims, 7 Drawing Figures

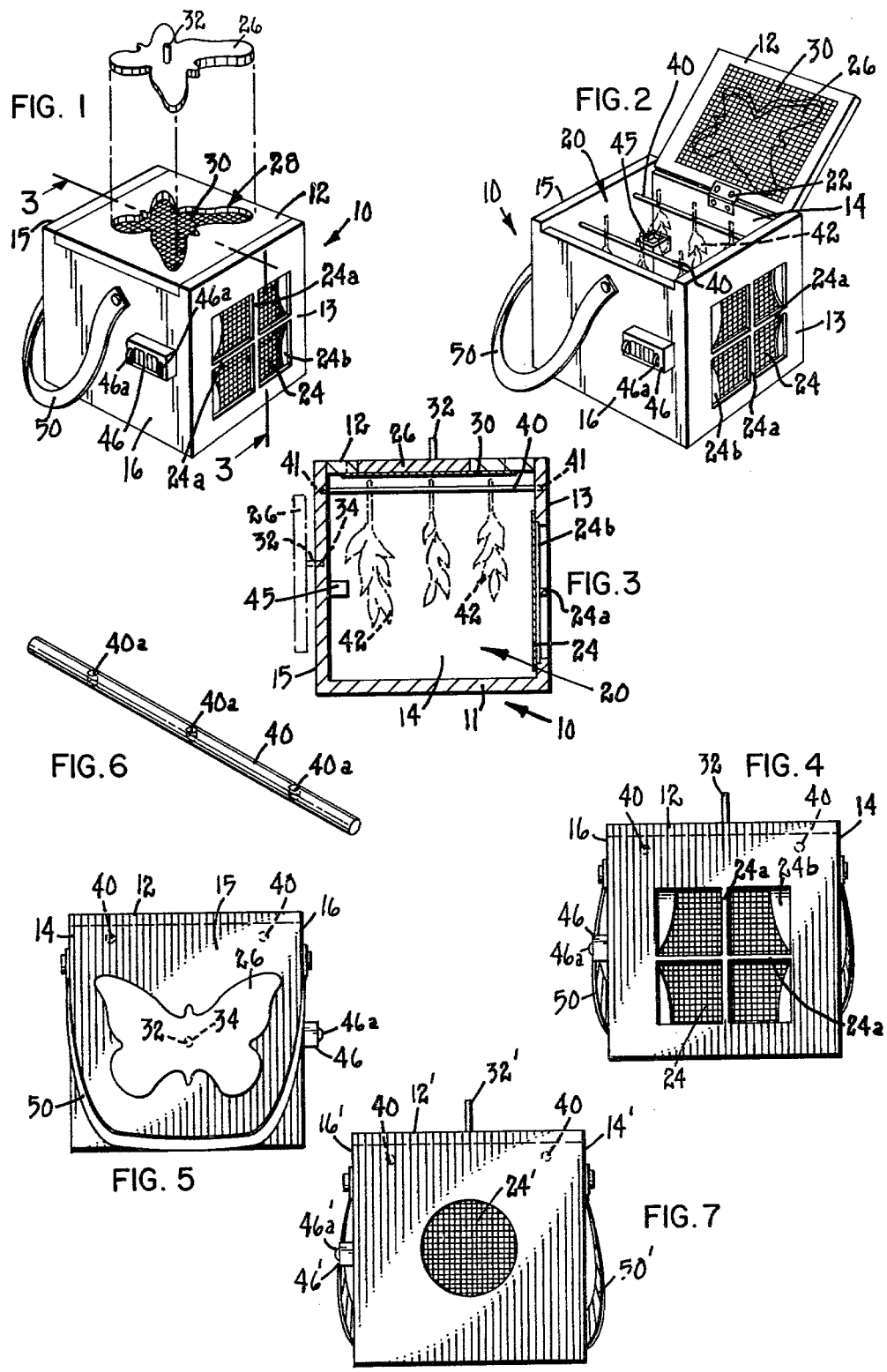

ANIMAL OBSERVATORY AND TOY APPARATUS

TECHNICAL FIELD

This invention relates broadly to animal observatory cage apparatus. More particularly, this invention relates to such an observatory cage apparatus for small animals of the type which undergo metamorphosis as a portion of their life-cycle, and to such an observatory apparatus which is suitably sized for ease of handling by smaller children and which includes features that make the observatory apparatus particularly functional as a child's toy.

BACKGROUND OF PRIOR ART

Animal observatory cage apparatus, in general, are known in the art. Such apparatus of the prior art, however, has not satisfied the need for a simple, rugged and humane observatory for small animals, which can be safely and easily used and handled by a smaller child.

A first "type" of such observation cage of the prior art is the well-known simple layer or screen cage that functions as a kennel for larger animals or a pet cage for smaller animals (e.g. bird cages or gerbil cages). Typical of this type of cage is its "open" feature, or the fact that such cages (except perhaps for their floors) are substantially open to the external environment by reason of their wire or screen mesh walls. Such cage-type apparatus are not very practical for housing smaller animals or insects, for the purpose of observing their life-cycles or mannerisms, in a "natural" environment. Variations of this "first" type of cage have included pet shipping containers, designed primarily for protecting a pet housed thereby during transportation. Examples of such cages are illustrated in U.S. Pat. Nos. 3,611,994 and 3,834,352. Such variations, while generally "closing" substantial portions of the normally "open" peripheral wall area of the cage, are also not very practical for use as observatory cages for viewing smaller animals in their natural habitats.

A second class or "type" of animal observatory cage includes the experimental, educational and laboratory observatories, that are particularly suitable for conducting experimental, genetic or behavioral studies, under laboratory conditions, on various life-forms such as insects. Examples of such laboratory observatories are illustrated in U.S. Pat. Nos. 3,580,219; 3,626,902; 3,687,110 and 3,874,335.

Observatories of the prior art that fall within the laboratory or "second" type listed above, typically include one or more glass or otherwise light-transparent walls for permitting unobstructed visual access into the inner cavity portions of the observatory. While the "visibility" feature of such observatories is advantageous to an outside observer under controlled laboratory conditions, it is not particularly humane to the captive animal if such observatories are used by smaller children in non-laboratory conditions, for holding smaller animals or insects for observation. Smaller children, with significantly shorter attention spans than their adult counterparts are prone to forget the observatory cage in direct sunlight for extended periods of time. When used in such non-laboratory conditions, such insect observatories of the prior art can be likened in their non-humane treatment of the confined animal, to the well-known glass fruit jar observatories often used by children. Under such non-laboratory applications, the heat radiated by sunlight through the glass, creates an unnatural and often deadly condition for the confined animal, that destroys the desired natural environment condition under which the animal's habits are to be viewed. Further, the breakable nature and complexity of such prior art insect observatories, makes them unattracted and potentially hazardous for everyday child use and abuse thereof.

The present invention fills a need in the art for a simple, rugged and highly humane small animal observatory, that is particularly practical and use-flexible for application by children in observing life habits and life-cycles of a large variety of small animals. The observatory cage of this invention is sized for easy carrying by a child. Its construction is rugged, and of a nature and style such that it can humanely house smaller animals such as caterpillars and tadpoles in natural environment such that they can be observed during metamorphosis in their life-cycles into butterflies and frogs respectively. The present invention also serves as a natural habitat cage for other small animals or pets. The observatory of this invention is designed to enable easy access into the confining internal cavity portion thereof for loading and unloading of the observatory, and includes a unique observation port configuration that opens to provide ready observation of the animals contained therein without interfering with the natural environment and also doubles as a novelty or toy feature for the child. The materials and style of the observatory are selected so as to further enhance creation of a natural environment within the observatory, as well as an aesthetically pleasing and functional external appearance.

SUMMARY OF THE INVENTION

The present invention comprises an observatory cage apparatus suitably sized to be carried by a child. The observatory cage apparatus includes:

(a) an enclosed observatory cage for retainably housing at least one small animal, including a floor member and a plurality of wall members cooperatively connected with the floor member and defining therewith an enclosed internal cavity;

(b) access means associated with at least one of the wall members, for enabling movement of the wall member to permit loading and unloading access into the internal cavity;

(c) means for ventilating the internal cavity;

(d) a removable plug member normally operatively forming a portion of one of the wall members and being removable therefrom to define an observation port through that wall member and into the internal cavity; and (e) retention means for retainably attaching the plug member to the observatory cage when the plug member is removed from its normal wall-forming position.

In a preferred embodiment of the invention, the enclosed observatory cage comprises a box-like enclosure having a lower floor, an upper lid spaced from the floor and a plurality of sidewalls interconnecting the lid and the floor so as to define the enclosed internal cavity. In the preferred construction of the apparatus, the lid, floor and sidewalls are constructed from a non-transparent material.

In the preferred embodiment of the invention, the access means is operatively connected with the upper lid wall, for permitting movement of the upper lid relative to the sidewalls, for enabling access into the internal cavity. In the preferred structure of the invention, the ventilation means is formed through at least one of the sidewalls, and may comprise a screened vent configured in a stylized shape such as a window.

In a preferred configuration of the invention, the removable plug member is formed within the upper lid of the observatory cage and normally forms an integral part thereof, to close the upper lid. The plug member is removable from the upper lid, to expose an underlying observation port through the upper lid and into the internal cavity. Obstruction means, preferably in the form of a screen member, are operatively connected to the upper lid and span across the observation port in a manner which permits visual observation through the observation port when the plug is removed, while preventing physical egress from the internal cavity and through the observation port.

In a preferred embodiment of the invention, the removable plug member has a handle member to facilitate ease of removal of the plug from the upper lid and maneuverability of the plug member. The retention means for attaching the plug member to the observatory cage includes receptor means forming a part of at least one of the sidewalls of the cage, for retainably holding the plug member handle, thereby securing the plug member to the sidewall. In the preferred configuration of the invention, the receptor means holds the plug handle in a manner whereby the plug member is secured in cantilevered manner by the handle and in slightly spaced relationship to the sidewall.

An additional feature of the invention includes at least one removable support bar extending within the internal cavity and between the sidewalls thereof, for supporting objects in hanging relationship above the floor of the internal cavity. In a preferred configuration of the support bar comprises a slightly flexible rod-like member that is retainably supported at its ends by holes formed within two oppositely disposed sidewalls, and is readily removable therefrom. The rod-like member includes at least one hole formed therethrough at an angle to the longitudinal axis of the rod-like member, for frictionally holding stem bearing objects. Another feature of the invention includes a reservoir mounted within the internal cavity of the cage apparatus and spaced from the floor member. Other features of the invention include a settable counter for entering and recording digital information and a carrying handle or strap for the observatory cage.

While the present invention will be described with respect to a preferred configuration or configurations of the invention, it will be understood that a number of variations to both the materials described and the size and shape of various portions of the invention may be made, without departing from the spirit and scope of this invention. For example, and with no intent to be construed in a limiting manner, while the preferred embodiment of the observatory cage/toy apparatus will be described as being constructed of wood or plastic material, it will be understood that other materials which satisfy the properties of the invention as claimed, could be used. Further, while a preferred geometric (rectangular) shape of the invention will be disclosed, it will be understood that the invention applies to other geometric configurations as well. Further by way of example, while particular configurations and orientations of the venting means for the internal cavity will be described with respect to the preferred embodiments of the invention, it will be understood that other configurations and orientations could equally well apply. Also by way of example, while the removable plug-type member of the invention will be described with respect to a particular shape, location and method of retainably holding the plug member to the cage structure when it is removed for exposing an observation port, it will be understood that other shapes, locations and retention means could be employed within the spirit and scope of this invention. Further, by way of example, it will be understood that other variations of the support rod structure, of the settable counter feature and of the carrying handle could also be configured, in a manner different from what will be disclosed with respect to the preferred embodiment structure of the invention to be hereinafter described.

It will be understood that the above specifically identified possible changes in configuration of the invention not only representative of those changes which can be made, and yet fall within the scope of the claims. Various advantages and features of novelty which characterize the invention are pointed out with particularly in the claims, annexed hereto and forming a part hereof. However, for a better understanding of the invention and its advantages obtained by its use, reference should be had to the Drawing which forms a further part hereof and to the accompanying descriptive matter in which there are illustrated and described several embodiments of the invention.

BRIEF DESCRIPTION OF THE DRAWING

Referring to the Drawing, wherein like numerals represent like parts throughout the several views:

FIG. 1 is a view is perspective of an animal observatory and toy apparatus constructed according to the principles of this invention, illustrating in exploded view, removability of the removable plug member from the observatory cage;

FIG. 2 is a view in perspective of the apparatus disclosed in FIG. 1, illustrating the upper lid member thereof in an open position, permitting access into the internal cavity of the observatory cage, and also illustrating certain internal features of the observatory cage;

FIG. 3 is a cross-sectional view of the apparatus disclosed in FIG. 1, generally viewed along the line 3—3 of FIG. 1, illustrating in phantom, positioning of the removable plug member as it would appear when retainably secured to the sidewall of the observatory apparatus, and illustrating in phantom leaf foliage as it would appear suspended within the internal cavity by the removable support rods;

FIG. 4 is a front view of the apparatus disclosed in FIG. 1;

FIG. 5 is a back view of the apparatus disclosed in FIG. 1, illustrating the removable plug member in a retainably held position on the back sidewall of the observatory cage;

FIG. 6 is a perspective view of one of the removable support bars disclosed in FIGS. 2 and 3; and FIG. 7 is a front view of an alternative embodiment of an observatory cage such as disclosed in FIG. 1.

DETAILED DESCRIPTION OF THE INVENTION

Referring to the Figures, there is generally illustrated at 10 an animal observatory and toy apparatus. In the preferred embodiment, the observatory/toy apparatus is configured in the shape of a box-like enclosure or observatory cage suitable for retainably housing at least one small animal. In the preferred application for the invention, the observatory 10 is configured to hold caterpillars for observation during their metamorphosis from the caterpillar to the butterfly or moth stages of their life cycles. It will be understood, however, that the apparatus described and claimed herein could equally well be used for housing other small animals or insects such as (but not limited to) frogs, turtles, winged insects of various kinds, etc.

The animal observatory of the preferred embodiment, illustrated in the Figures, comprises a six-sided box-like geometrical configuration, having a floor member 11, an upper lid member 12 and a plurality of sidewalls 13, 14, 15 and 16. (See FIG. 2). In the embodiment of the invention disclosed, sidewall 13 will be referred to as the "front" sidewall; sidewall 15 will be referred to as the "back" sidewall; and sidewalls 14 and 16 respectively will be referred to as the "right" and "left" sidewalls respectively. While the preferred embodiment of the invention illustrated comprises a floor (11) and five "wall" members (12-16), it will be understood that a number of alternate geometrical configurations could equally well be envisioned within the spirit and scope of this invention.

The sidewalls 13-16 extend between the floor member 11 and the upper lid 12, and the six surfaces collectively define an internal cavity 20 which is used to house the animal to be observed. It will be understood throughout this description that the term "animal" is used in its broadest sense, and includes "insects" as well as other life forms that fall within the broad generic description of the term "animal". In the preferred embodiment, the observatory cage 10 is approximately seven inches square, which is sized small enough to be easily handled by a small child (for example by a five-year old), and yet defines an internal cavity 20 of sufficient size to provide a comfortable environment for the animal to be housed thereby. It will be understood that the size of the observatory cage can be varied within the scope of this invention, however, the overall size should be retained sufficiently small so as to maintain ease of portability by a smaller child.

The floor, upper lid and sidewalls (11-16) are preferably formed of a non-transparent material of a nature which inhibits the passage of sunlight directly therethrough. The term non-transparent, however, does not exclude translucent materials. In the preferred embodiment, the observatory cage is molded from plastic material; however, other material including wood, could equally well be employed. When molded from plastic, the juncture of the sidewalls 13-16 with the floor 11 forms a water-tight juncture, which enables the lower portion of the internal cavity 20 to be flooded for housing small aquatic animals, or animals which require wet environments. Usage of non-transparent materials inhibit the build-up of excessive heat within the internal cavity, thus ensuring a more stable and humane environment therein, should the observatory cage 10 be left for extended periods of time in direct sunlight. Also, the materials used for constructing the observatory cage should be of sufficient durability to withstand rugged abuse, to prevent breakage of the observatory cage should it be dropped, thus increasing the usable life of the observatory cage and decreasing the possibility of injury to a child due to breakage.

In the preferred embodiment of the invention disclosed, loading and unloading access to the internal cavity 20 is provided by movement of the upper lid 12, as illustrated in FIG. 2. The upper lid 12 is pivotally secured along one of its edges to the right sidewall 14 by a hinge member 22. When disposed in an "open" position as illustrated in FIG. 2, the upper lid provides rapid access to substantially the entire internal cavity 20. When the upper lid 12 is pivoted to a "closed" position as illustrated in FIGS. 1 and 3, the lid forms an upper barrier to escape by the retained animal from the internal cavity 20. While a particular type of lid closure means is disclosed with respect to the preferred embodiment of the cage apparatus, it will be understood that other appropriate configurations for providing access for loading and unloading the internal cavity can be provided. For example, but not by way of limitation, the upper lid could equally well be "slid" to its open and closed positions, instead of using a hinge structure. Similarly, the access means for loading and unloading the internal cavity 20 need not necessarily be provided through the upper surface of the observatory cage, but could equally well be provided through one of the sidewalls thereof, or even through the floor.

A screen member for ventilating the internal cavity 20 is illustrated generally at 24. In the preferred embodiment of the invention disclosed in FIGS. 1 through 4, the ventilating screen is formed within the front sidewall 13 of the observatory cage, and is stylized in the shape of a window having cross bars generally designated at 24a and molded, recessed tab portions simulating a curtain effect at 24b. The mesh size of the screen for the ventilating port 24 is selected to retainably hold the particular animal to be housed within the internal cavity 20, and comprises in the preferred embodiment, ⅛ inch hardware cloth, selected for retainably holding caterpillars within the internal cavity 20. It will be understood that other configurations for providing the ventilating capability can be configured within the spirit and scope of this invention. It is preferred that not all of the sides of the observatory cage be ventilated, so as to maintain a more natural habitat or environment within the internal cavity 20. An alternate embodiment of a configuration for the ventilating port is illustrated at 24' in FIG. 7. It will be understood that many other possible configurations can be designed within the spirit and broad scope of this invention.

A unique feature of this invention, which is particularly attractive to children and which provides this invention with the duplicate function of a toy as well as an educational or observatory device, is the removable plug member 26 and the method and means by which it is secured to the outer surface of the observatory cage 10. The removable plug member 26 is, in the preferred embodiment disclosed, cut from and actually forms a part of the upper lid member 12. In the preferred embodiment of the invention, which is configured to house caterpillars during their metamorphosis into butterflies, the plug member 26 is configured in the shape of a butterfly. When resting in place within the upper lid member 12, as indicated in FIGS. 2 and 3, the removable plug member 26 forms an integral part of the upper lid 12. When removed from the upper lid 12 as indicated in exploded view in FIG. 1, the removable plug member 26 defines an observation port (generally indicated at 28) through the upper lid 12, for viewing into the internal cavity 20. The hole vacated by the removable plug member is blocked by obstruction means, which is in the preferred embodiment hardware cloth 30 which is appropriately affixed by glue, staples or otherwise to the inner surface of the upper lid member 12 (as indicated in FIG. 2). It will be understood, that while not previously discussed, the screen member associated with the ventilating ports 24 is also appropriately affixed by glue, staples or otherwise to the inner surface of the front sidewall 13, as illustrated in FIG. 3. The screen cloth 30, is appropriately sized to prevent egress through the observation port 28, of animals retainably held within the internal cavity 20, when the removable plug member 26 is removed from the upper lid 12. It will be understood that other obstruction means, such as (by way of example only) transparent plastic or vinyl, could equally well be used to close from egress therethrough, the observation port 28.

As indicated above, in the preferred application for the observation cage, the removable plug member 26 has been shaped in the configuration of a butterfly. By way of example only, other configurations for the removable plug member, which suit the particular application to which the observation cage is to be put, can be made, such as a grasshopper shape, a toad or frog shape, a turtle shape, etc. Alternatively, the particular shape of the removable plug member 26 need not have any association with the end use to which the observation cage/toy apparatus is to be put.

In the preferred embodiment illustrated, a dowel-like handle member 32 projects upwardly from the removable plug member 26 and extends externally of the observatory cage 10. The handle 32 is in the preferred embodiment approximately one inch in length and ¼ inch in diameter, which enables a user of the apparatus to easily grasp the handle 32 for removal of the plug member 26 from the upper lid 12. A recess or hole 34 formed within the rear wall 15 of the observatory cage 10 is sized for matingly receiving the handle 32 in sliding frictional engagement, and forms a receptor means therefor. Therefore, when the removable plug member 26 is removed from the upper lid, it can be conveniently secured to the back wall 15 by placing the handle 32 securely within the retaining hole 34, as illustrated in FIG. 5 and as illustrated in phantom in FIG. 3. In the preferred embodiment, when the removable plug member 26 is secured within the hole 34, the general body portion of the plug member 26 is supported in cantilevered manner by the handle 32, and is slightly spaced from the outer surface of the back wall 15, as illustrated in FIG. 3. This securing feature for the removable plug member 26 not only provides a highly pleasing aesthetic effect, but also prevents loss of the movable plug member, which otherwise could be easily mislayed or misplaced after removal. The process of removing the plug member 26 and of securing the handle of the plug member into the retaining hole 34 also provides significant amusement to smaller children, in the manner of a toy.

Alternate configurations for retainably holding the removable plug member 26 once it is removed from the wall member 12 can be configured within the spirit and intent of this invention. For example, a variation of the dowel (32) and hole (34) configuration includes coarsly threading both the dowel and the hole, wherein the handle 32 would be threaded into the retaining hole 34 (not illustrated). Other retention configurations, which need not necessarily involve placement of the handle 32 within the retention means for the removable plug member 26 can also be configured within the spirit and intent of this invention.

Referring to FIG. 2, a pair of rod-like support members 40 are disposed in generally parallel manner with respect to one another, and with respect to the upper lid 12, between the front and the back walls 13 and 15 respectively of the observatory cage 10. In the preferred embodiment, the support rods 40 are secured within recessed holes 41 formed within the front and back walls 13 and 15 respectively, and which matingly receive the oppositely disposed ends of the support rods 40 (see FIG. 3). In the preferred embodiment, the support rods 40 comprise dowel-like plastic members, being sufficiently flexible to permit bending of the support rods sufficiently so as to permit them to be readily snapped in to and out of retaining engagement with the recessed holes 41. An enlarged view of one of the support rods 40 is illustrated at FIG. 6. Referring thereto, the support rod 40 includes a plurality of holes drilled through the support member at a 90 degree angle to the longitudinal axis of the dowel member. In the preferred embodiment, the diameter of the support rod 40 is approximately ⅜ inch, and the diameter of the holes 40a are ⅛ inch. The support rods 40 serve as leaf or twig "hangers" and function to suspend twigs or stem-bearing foliage (illustrated in phantom at 42 in FIGS. 2 and 3) above the floor 11. Due to the ease of removability and insertion of the support rods 40, they also enhance the "toy" feature of the cage apparatus when inserted and removed from the internal cavity. When leaves and other foliage is suspended from the support rods 40, a more natural environment can be created within the internal cavity 20, for the occupant or occupants being housed thereby.

In the preferred embodiment, the internal cavity 20 is provided with a reservoir 45 secured to the right and rear walls 14 and 15 respectively in spaced relationship between the floor 11 and the upper lid 12. In the preferred embodiment, the reservoir is approximately ½ inch wide, is relatively shallow, but of sufficient depth to hold a small quantity of water for the animal to be retained within the internal cavity 20. As previously stated, the entire lower surface of the internal cavity 20 could be alternatively filled with water for aquatic-type animals.

An additional feature of the invention includes a counter generally illustrated at 46. The counter may be any appropriate numerical counter having the capability of presetting numbers therein. In the preferred embodiment, the counter 46 is a simple thumb-wheel entry type, wherein the thumb wheels are indicated at 46a in the Figures. In the preferred application for the observatory cage 10, the counter 46 may be used to count the number of caterpillars housed within the internal cavity 20, or alternatively may be used to keep track of the number of days remaining in the incubation stage of the caterpillar during its metamorphosis from a caterpillar to a butterfly. It will be understood that while a two-stage counter is illustrated in the Figures, any number of stages could be employed.

The observatory cage 10 is provided with a carrying handle or strap 50, preferably sized long enough to serve as a shoulder strap for a child. It will be understood that while a shoulder strap is described and illustrated, other appropriate carrying handles could be employed within the spirit and intent of this invention.

From the foregoing description, it will be appreciated that the present invention provides a unique combination of practical features of an observation cage for smaller animals, which make it particularly attractive and suitable for use by children. The removable plug member 26 with its retention means provides not only a unique functional capability as an observation port into the internal cavity of the observation cage, but also serves as an amusement or toy feature, as well as providing a uniquely aesthetic effect to the overall structure.

A number of modifications of the invention have been described throughout the description of the preferred embodiments of the invention. Other modifications of the invention will be apparent to those skilled in the art in light of the foregoing description. This description is intended to provide specific examples of individual embodiments which clearly disclose the present invention. Accordingly, the invention is not limited to the described embodiments, or to the use of specific elements therein. All alternative modifications and variations of the present invention which fall within the spirit and broad scope of the appended claims are covered.

What is claimed is:

1. Observatory cage apparatus suitably sized to be carried by a child, comprising:
   (a) an enclosed observatory cage for retainably housing at least one small animal, comprising:
      (i) a floor member; and
      (ii) a plurality of wall members cooperatively connected with said floor member to define therewith an enclosed internal cavity;
   (b) access means associated with at least one of said wall members, for enabling movement of said one wall member to permit access into said internal cavity;
   (c) means for ventilating said internal cavity while preventing egress therefrom of items placed for observation within said internal cavity;
   (d) a removable plug member normally operatively forming a portion of one of said wall members and being removable therefrom to define an observation port through that wall member into said internal cavity while preventing egress therethrough of items placed for observation within said internal cavity; said plug member being removable from said one wall member in an outward direction, away from said internal cavity, and generally perpendicular to the general plane of said one wall member;
   (e) retention means for retainably attaching said plug member to said observatory cage when said plug member is removed from its normal wall-forming position; wherein said retention means includes:
      (i) a handle member projecting outwardly from said plug member in a direction away from said internal cavity when said plug member is inserted within and positioned to form a portion of said one wall member; and
      (ii) receptor means formed within a second of said plurality of wall members for retainably accepting and holding said handle, whereby said plug member becomes externally removably secured to said second of said wall members when said handle is placed within said receptor means.

2. Observatory cage apparatus as recited in claim 1, wherein said handle comprises a dowel shaped member generally perpendicularly projecting from the general plane of said plug member, and wherein said receptor means comprises a recess formed within said one sidewall and sized to matingly engage said dowel shaped member in tight frictional engagement.

3. Observatory cage apparatus as recited in claim 1, wherein said handle comprises a threaded dowel shaped member generally perpendicularly projecting from the general plane of said plug member, and wherein said receptor means is internally threaded for retainably cooperatively accepting, in threaded engagement, said dowel member.

4. Observatory cage apparatus as recited in claim 1, further including at least one settable counter, operatively connected to said enclosed observatory cage.

5. Observatory cage apparatus as recited in claim 1, further including a handle for carrying said enclosed observatory cage.

6. Observatory cage apparatus as recited in claim 1, wherein said enclosed observatory cage includes at least five of said wall members.

7. Observatory cage apparatus as recited in claim 1, wherein said floor and said wall members of said observatory cage are constructed of non-transparent materials; and further including means operatively connected with said one wall member and normally underlying said removable plug member for permitting visual observation through said observation port when said plug member is removed from said wall member, but for preventing egress of items of the type normally retainably held for observation within said enclosed internal cavity, through said observation port.

8. Observatory cage apparatus as recited in claim 7, wherein said means underlying said plug member comprises a screen mesh.

9. Observatory cage apparatus as recited in claim 1, wherein said plurality of wall members include a lid member generally oppositely disposed from said floor member, and a plurality of sidewalls interconnecting said floor and said lid members to define said enclosed internal cavity; and wherein said access means operatively connects said lid member for opening and closure movement with respect to said plurality of sidewalls.

10. Observatory cage apparatus as recited in claim 9, wherein said access means comprises a hinge operatively connecting said lid member for pivotal movement about one of its edges, with respect to one of said sidewalls.

11. Observatory cage apparatus as recited in claim 9, further including a reservoir extending from at least one of said sidewalls and spaced from said floor member.

12. Observatory cage apparatus as recited in claim 9, further including at least one removable support bar projecting between two of said sidewalls, for suspending objects in downwardly depending manner therefrom, over said floor member.

13. Observatory cage apparatus as recited in claim 12, wherein at least two of said sidewalls have retention depressions formed therein, and wherein said support bar comprises a slightly flexible rod-like member removably frictionally supported between said retention depressions and having at least one hole formed therethrough at an angle to the longitudinal axis of said rod-like member, said hole being sized to retainably hold small cylindrical objects such as twigs or leaf stems.

14. Observatory cage apparatus as recited in claim 9, wherein said floor member, said lid member and said sidewalls are constructed of non-transparent material.

15. Observatory cage apparatus as recited in claim 14, wherein said ventilation means comprises a screened vent formed through at least one of said sidewalls.

16. Observatory cage apparatus as recited in claim 15, wherein said screened vent is configured in the shape and style of a window.

17. Observatory cage apparatus as recited in claim 1, wherein said removable plug member normally forms a part of said lid member.

18. Observatory cage apparatus as recited in claim 1, wherein said removable plug member has an outline configuration in the shape of an animal.

19. An observatory cage and toy apparatus particularly suitable for housing small animals for observation during metamorphosis life-cycles, comprising:
   (a) a box-like enclosure having a lower floor, an upper lid spaced from said floor and a plurality of sidewalls interconnecting said lid and said floor, defining an enclosed internal cavity suitable for housing small animals; said lid, said floor and said sidewalls being constructed of non-transparent material;
   (b) access means for permitting movement of said upper lid relative to said sidewalls, enabling access into said internal cavity;
   (c) ventilation means formed through at least one of said sidewalls for ventilating said internal cavity, while preventing egress therefrom of items placed for observation within said internal cavity;
   (d) a removable plug member formed within said upper lid and normally forming an integral part thereof, said plug member being removable from said upper lid to expose an observation port through said upper lid and into said internal cavity;
   (e) obstruction means operatively connected to said upper lid and spanning said observation port, for permitting visual observation through observation port while preventing physical egress from said internal cavity and through said observation port;
   (f) a handle secured to said removable plug member, enabling ease of removal and physical maneuverability of said plug member; and
   (g) receptor means forming a part of at least one of said sidewalls for retainably holding said handle, thereby securing said plug member to said sidewall.

20. An observatory cage and toy apparatus as recited in claim 19, wherein said receptor means holds said handle in a manner whereby said plug member is secured to said one sidewall in cantilevered manner by said handle and in slightly spaced relationship with respect to said one sidewall.

21. An observatory cage and toy apparatus as recited in claim 19 wherein said obstruction means comprises a screen mesh material disposed across said observation port and normally underlying said removable plug member associated therewith; said screen mesh material having a mesh sized sufficiently small to retain objects normally to be held for observation within said internal cavity.

22. An observatory cage and toy apparatus as recited in claim 19 further including at least one settable counter for recording digital entries.

23. An observatory cage and toy apparatus as recited in claim 19, further including a reservoir, mounted to at least one of said sidewalls and within said internal cavity, in spaced relationship between said upper lid and said lower floor.

24. An observatory cage and toy apparatus as recited in claim 19, further including a carrying handle for the cage, secured to said sidewalls thereof.

25. An observatory cage and toy apparatus as recited in claim 19, including means operatively connected for ease of removability within said internal cavity, for supporting objects in hanging relationship above said floor, within said internal cavity.

26. An observatory cage and toy apparatus as recited in claim 25, wherein said support means comprises at least one readily removable flexible dowel member retainably supported at its ends between two of said sidewalls, said dowel member having at least one hole formed therethrough and at an angle to the longitudinal axis of said dowel member for frictionally holding stem-bearing objects.

27. An observatory cage and toy apparatus as recited in claim 24, including a plurality of said flexible dowel members supported by said sidewalls, adjacent said upper lid, and in spaced and generally parallel manner with respect to each other.

* * * * *

UNITED STATES PATENT AND TRADEMARK OFFICE
CERTIFICATE OF CORRECTION

PATENT NO. : 4,282,829

DATED : August 11, 1981

INVENTOR(S) : DENNIS O. TWEED

It is certified that error appears in the above-identified patent and that said Letters Patent are hereby corrected as shown below:

On the cover page of the patent, the inventor's address should be changed from "Rochester, Mich." to read-- Rochester, Minn.--.

In the Abstract, in the last sentence thereof, "reservoir (40)" should be changed to read-- reservoir (45)--.

In column 4, line 20, the word "particularly" should read-- particularity--.

In column 4, line 32, the second "is" should read-- in--.

Signed and Sealed this

Second Day of March 1982

[SEAL]

Attest:

GERALD J. MOSSINGHOFF

Attesting Officer     Commissioner of Patents and Trademarks